United States Patent [19]

Han

[11] Patent Number: 4,652,473
[45] Date of Patent: Mar. 24, 1987

[54] TAMPER-RESISTANT PACKAGING TAPE

[75] Inventor: Hak-Rhim Han, Newport, Minn.

[73] Assignee: Minnesota Mining and Manufacturing Company, St. Paul, Minn.

[21] Appl. No.: 679,763

[22] Filed: Dec. 10, 1984

[51] Int. Cl.$^4$ .............................................. B32B 7/10
[52] U.S. Cl. ........................................ 428/35; 156/86; 215/246; 428/40; 428/343; 428/916
[58] Field of Search ............... 428/203, 204, 205, 906, 428/916, 343, 35, 40; 156/86; 215/246; 220/214

[56] References Cited

U.S. PATENT DOCUMENTS

| 2,974,057 | 3/1961 | Adams | 428/203 X |
| 3,075,868 | 1/1963 | Long | 156/242 X |
| 3,088,848 | 5/1963 | Tritsch | 428/343 |
| 3,294,621 | 12/1966 | Baird, Jr. et al. | 428/520 |
| 3,827,591 | 8/1974 | Spelman et al. | 428/916 X |
| 4,082,873 | 4/1978 | Williams | 428/204 X |
| 4,333,968 | 6/1982 | Nahmias | 428/518 X |
| 4,351,877 | 9/1982 | Williams | 428/350 |

Primary Examiner—Henry F. Epstein
Attorney, Agent, or Firm—Donald M. Sell; James A. Smith; David L. Weinstein

[57] ABSTRACT

A pressure sensitive adhesive tape capable of providing tamper detection to capped containers and comprising a backing having an outer layer with sufficiently high tensile strength to maintain its integrity when removed from the tape and an inner layer adjacent the adhesive which is thin and deformable, wherein the outer layer can be removed from the inner layer without disrupting the adhesive bond of the inner layer to the pressure sensitive adhesive.

33 Claims, 3 Drawing Figures

TAMPER-RESISTANT PACKAGING TAPE

TECHNICAL FIELD

The invention relates to a tamper-resistant and unitizing packaging tape in which tamper resistance is obtained through the delamination of the backing thereof.

BACKGROUND ART

Because of recent activities relating to the discovery of foreign substances in commercial products in the pharmaceutical and cosmetic area, tamper-resistance has become a highly critical packaging requirement. In fact, numerous regulations relative thereto have recently appeared.

Various concepts have been suggested relative to providing tamper-resistant sealing. One concept utilizes a tape with a pressure-sensitive adhesive thereon, the tape backing being an amorphous film material which is first oriented, then shrunk onto a capped bottle top with heat. While such a construction has achieved commercial success, same does not provide a sufficient degree of tamper resistance because the backing has a sufficiently high tensile strength that same can be peeled off the container top without breakage of the tape, thus allowing for reapplication without providing sufficiently noticeable evidence of tampering.

My invention relates to a pressure sensitive tape capable of providing a high degree of tamper resistance to the seal of caps with bottles, jars, boxes or tubs having the tape applied thereto. Furthermore, my tape also has utility in the area of unitizing individual containers, such as cereal or candy boxes.

DESCRIPTION OF THE DRAWINGS

More specifically, FIG. 1 illustrates capped and sealed bottle or container 10 with my tape 15 in a shrunk-on position around cap 13 and capped bottle or container 14. Outer backing layer 11 is partially peeled from tape 15 to reveal inner backing layer 12 having distinctive tamper proof indication thereon.

FIG. 2 illustrates tape 15 in a pre-applied condition, illustrating outer backing layer 11, inner backing layer 12, with tamper indicating logo thereon, and pressure sensitive adhesive 16.

FIG. 3 illustrates a unitized carton system 20 wherein tape 15 unitizes cartons 21 so as to make them a unitary package. After outer backing layer 11 is removed, each of the cartons 21 can be simply detached from the unitary package for use.

DETAILED DESCRIPTION OF THE INVENTION

Figure 1:
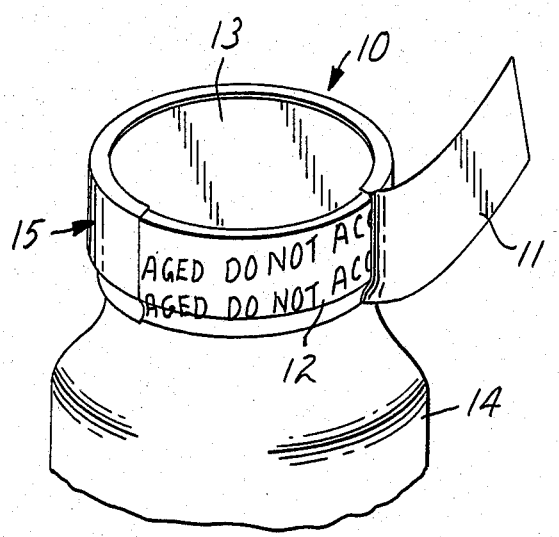
FIG. 1 represents a perspective view of my tape in semi-sealed position around a cap and container, with the outside layer of the backing in a semi-removed position.
Figure 2:
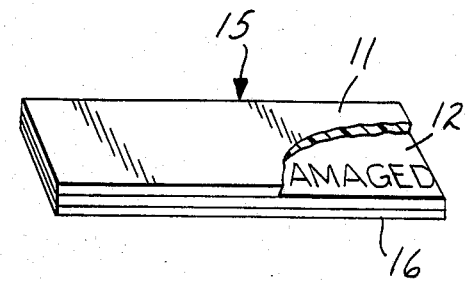
FIG. 2 is a perspective view of my tape with the outer backing layer partially cut out to illustrate the inner backing layer.

The key concept of my tape construction 15 resides in the fact that the backing thereof in reality comprises two separate layers. Outer layer 11 is an amorphous or crystalline plastic film which, after orientation, displays excellent shrink properties when heated above its glass transition temperature. Examples of such plastic materials include polyvinyl chloride, polystyrene, styrene butadiene copolymers, copolyesters, and polypropylene. As noted above, if such materials are used by themselves as a tape backing, a degree of tamper resistance is provided, but it is not as good as the tamper resistance properties of my invention. This is true because the crystalline or amorphous plastic film has such a high tensile strength that it can be peeled from the bottle opening without break, and thus can be reapplied, therefore reducing its effectiveness for displaying tampering evidence.

The second or inner layer 12 of my tape backing includes a material which is a very thin, i.e., typically less than about 2.0 mils, and preferably from about 0.7 to 1.5 mils, stretchable or deformable plastic film or coating, which can be either amorphous or crystalline, and which displays a very high elongation, i.e., from about 200 to about 600 percent, and preferably about 500 percent. Preferably, layer 12 is transparent and colorless. Examples of suitable materials include polyethylene, ethylene/vinyl acetate copolymers and ethylene/propylene copolymers. Ethylene/vinyl acetate copolymers are preferred, with from about 7 to 15 percent, and more preferably 12 percent by weight vinyl acetate being satisfactory.

The relationship of the adhesion strength of adhesive 16 and the cohesive or bond strength between the two backing layers 11 and 12 must be balanced to ensure that the thin inner layer 12 is retained by adhesive 16 on the container opening while the outer backing layer 11 can be peeled away. It has been found that adhesives having an adhesion value of from about 20 to about 85 oz. per 0.5 inch (per ASTM D-3330) are generally satisfactory, with from about 40 to about 85 oz. per 0.5 inch being preferred.

Similarly, again pursuant ASTM D-3330, the peel strength or adhesion (or cohesion) between the two backing layers should generally be from about 0.035 to about 3.5 oz. per 0.5 inch, with from about 0.1 to about 0.5 oz. per 0.5 inch being preferred.

When the tape is applied around the capped opening of a bottle or container and shrunk thereon via heat, the tape remains uniformly tight with no evidence of bagginess or wrinkles, nor does it relax upon cooling. As the outer layer 11 of the tape backing is peeled from the bottle opening, it delaminates from inner layer 12, because of the adhesive versus cohesive strengths within the product. Thus, evidence of tampering is highly apparent. Furthermore, delamination of the outer layer 11 will generally cause a partial stretching out of the thin inner layer 12, further increasing the evidence of tampering.

To provide additional visual tamper indication, printed or colored layers can be utilized. Normally, the somewhat fragile inner layer 12 would be printed, utilizing distinctive designs, which would increase the visibility of tampering. Furthermore, printing onto colored layers, on either or both sides, provides the tape with a more complicated and more aesthetic tamper indicating packaging. For example, printing in white on a blue outer layer 11, together with the printing of a message in, for example, blue, on the preferably transparent inner layer 12 of the tape backing provides aesthetic appearance and evidence of tampering by virtue of the hidden message contained on the thin inner layer 12. As the blue outer layer 11 is peeled from the bottle, the colored message or logo would be clearly visible through the transparent inner layer 11, adding yet another degree of tamper resistance to the product.

Figure 3:
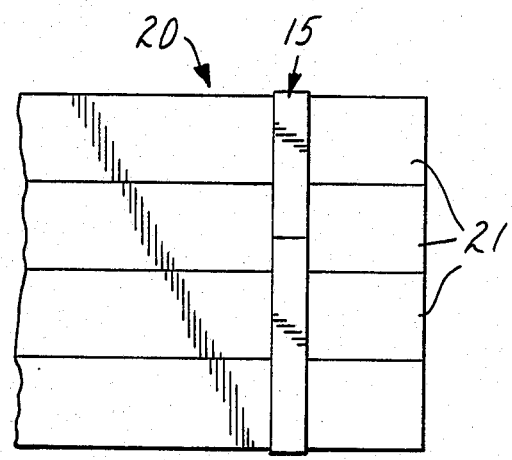
FIG. 3 is a top view of my tape in position to act as a unitizing member for cartons or boxes.

In the unitizing embodiment, individual containers such as small cereal boxes can be rendered a unitary structure. As FIG. 3 illustrates, the tape 15 can be applied over a number of individual containers 21. As the tough outer backing layer 11 is removed by peeling, the transparent second backing layer 12 remains, allowing each box to be removed as desired, without disruption to the functionality or aesthetics of each box 21. In this instance, the tough outer backing layer 11 need not be oriented to be rendered shrinkable, since same is unnecessary.

The delaminatable tape 15 of my invention can typically be manufactured by extrusion coating or solvent coating. In extrusion coating, the thin stretchy material can be conveniently melted in a conventional extruder and extruded and cast onto an oriented film designed to be used as the outer film 11 of my tape. Alternatively, the layers of the feeding can be co-extruded and oriented.

Solvent casting offers some advantages over extrusion coating, one being that coatings as thin as 0.1 of a mil can be applied to either oriented or unoriented plastic films, a thickness which cannot typically be achieved via extrusion. This is especially helpful with the unitizing aspect of my tape.

In conventional fashion, a low adhesion backsize can be applied to the outer backing layer 11.

The invention will now be illustrated in greater detail by the following non-limiting examples, wherein all parts are by weight unless otherwise specified.

The pressure-senstive adhesive composition applied to each of the thin, stretchy backing layers 12 disclosed in the Examples had the following formulation:

| Component | Parts By Weight |
|---|---|
| "Kraton 1107", tradename for a styrene=isoprene=styrene block copolymer from Shell Chemical | 100.0 |
| "Wingtack Plus", a hydrocarbon resin from Goodyear | 150.0 |
| "Zonarez Alpha-25", a polyterpene resin from Arizona Chemical Company | 50.0 |
| "Irganox 1076", an antioxidant from Ciba | 2.0 |
| "Tinuvin 770", an ultraviolet absorber from Ciba | 2.0 |

EXAMPLE 1

A low density polyethylene homopolymer resin, Eastman Chemical's "155OP", was melted in a conventional extruder, extruded and cast into the nip formed by internally cooled counter rotating rolls to a flat 0.5 to 1.5 mil thick film. The lamination thereof to an unplasticized polyvinyl chloride film, Forchim Company's "Europhan MG-40", occurred at the nip where the polyvinyl chloride film was threaded in to meet the polyethylene film.

EXAMPLE 2

An ethanol solution of a polyvinyl acetate/maleate copolymer, commercially available from Monsanto as "Gelva Multipolymer Solution 264", was diluted with toluene to provide a Brookfield viscosity of 44 cps and coated onto 1.5 mil thick polyester film by a rotogravure rulling mill and dried in an oven at 150° F. A dry coating weight of 9.62 gm/m² was obtained.

In addition, "Gelva Resin Solution V7-M50", tradename for a solution of polyvinyl acetate in methyl alcohol, commercially available from Monsanto, can be utilized in similar fashion to manufacture a two layered tape backing. A mixture of the "264" and "V7-M40" materials in a 1:1 weight ratio also functioned excellently.

Solutions of vinyl chloride/vinyl acetate copolymers can be used in similar fashion as the aforementioned polyvinyl acetate/maleate copolymer and polyvinyl acetate to manufacture a two layered tape backing. The vinyl acetate copolymers contain from about 4 to about 96 percent by weight vinyl acetate therein.

EXAMPLE 3

The backing of Example 2, namely the polyester/"Gelva V7-M50" material was coated with a conventional silicone-based low adhesion backsize onto the polyester surface of the backing to a coating weight of 0.374 gm/m², and the adhesive noted above was coated onto the "Gelva" layer, using a No. 31 Meier bar, to a coating weight of 27.2 gm/m², following which the product was dried.

EXAMPLES 4-9

In a fashion similar to Example 3 above, tapes were manufactured having the following components:

| Example # | Backing | Low Adhesion Backing |
|---|---|---|
| 4 | Polyester/Polyethylene | Silicone-Based |
| 5 | Polyester/"Gelva 264" | Silicone-Based |
| 6 | Polyvinyl Chloride/"Gelva V7-M50" | Liner Paper |
| 7 | "Polyvinyl Chloride/Polyethylene | Liner Paper |
| 8 | Polypropylene/"Gelva V7-M50" | Liner Paper |
| 9 | Polyvinyl Chloride/Polyethylene | Silicone-Based |

In use, any of these tapes can be applied to the capped opening of a bottle or container and heat shrunk while on the container, thus providing a tape which is capable of conforming to the contours of the capped container opening. The outer layer of each can be removed by peeling same off, i.e., delaminating, leaving the fragile second layer adhered to the container opening. Tamper resistance can also be provided on paper cartons or boxes where desired.

In addition, the tapes above can be utilized to unitize containers, such as for example cereal boxes. When it is desired to remove the tape to dispense individual boxes, only the top backing layer of the tape is removed, thus leaving the clear second layer on the package. This results in no damage to the package, either functionally or aesthetically, and allows easy separation of each individual package.

What is claimed is:

1. A pressure sensitive adhesive tape comprising a backing with a pressure sensitive adhesive thereon, said backing comprising an outer layer having a sufficiently high tensile strength to maintain its integrity when removed from said tape and a plastic inner layer, adjacent said adhesive, which is thin and stretchable or deformable, the adhesion between said outer and inner layers being sufficiently low when compared to the adhesion between said adhesive and said inner layer, whereby said outer layer may be removed from said inner layer without disrupting the adhesive bond between said inner layer and said adhesive.

2. The tape of claim 1 wherein said outer layer is capable of being rendered heat shrinkable.

3. The tape of claim 1 wherein said inner layer has an elongation from about 200 to about 600 percent.

4. The tape of claim 1 wherein said inner layer is colorless and transparent.

5. The tape of claim 1 wherein said outer layer is selected from the group consisting of polyvinyl chloride, polystyrene, styrene/butadiene copolymers, polypropylene and copolyesters.

6. The tape of claim 1 wherein said inner layer is selected from the group consisting of polyethylene, ethylene/vinyl acetate copolymers and ethylene/propylene copolymers.

7. The tape of claim 6 wherein said ethylene/vinyl acetate copolymer contains from about 7 to about 15 percent by weight vinyl acetate therein.

8. The tape of claim 1 wherein the peel adhesion between said outer and said inner layers is from about 0.035 to about 3.5 oz. per ½ inch.

9. The tape of claim 1 wherein the adhesion value of said adhesive is between about 20 and about 85 oz. per ½ inch.

10. A sealed container comprising an open-mouthed container having a cap sealed thereon, and adhesively attached to said cap and said container at the location of said cap a pressure sensitive tape, said tape comprising a backing with a pressure sensitive adhesive thereon, said backing comprising an outer layer having a sufficiently high tensile strength to maintain its integrity when removed from said tape and a plastic inner layer, adjacent said adhesive, which is thin and stretchable or deformable, the adhesion between said outer and inner layers being sufficiently low when compared to the adhesion between said adhesive and said inner layer, whereby said outer layer may be removed from said inner layer without disrupting the adhesive bond between said inner layer and said adhesive.

11. The container of claim 10 wherein said outer layer is capable of being rendered heat shrinkable.

12. The container of claim 10 wherein said inner layer has an elongation from about 200 to about 600 percent.

13. The container of claim 10 wherein said inner layer is colorless and transparent.

14. The container of claim 10 wherein said outer layer is selected from the group consisting of polyvinyl chloride, polystyrene, styrene/butadiene copolymers, polypropylene and copolyesters.

15. The container of claim 10 wherein said inner layer is selected from the group consisting of polyethylene, ethylene/vinyl acetate copolymers and ethylene/propylene copolymers.

16. The container of claim 15 wherein said ethylene/vinyl acetate copolymer contains from about 7 to about 15 percent by weight vinyl acetate therein.

17. The container of claim 10 wherein the peel adhesion between said outer and said inner layers is from about 0.035 to about 3.5 oz. per ½ inch.

18. The container of claim 10 wherein the adhesion value of said adhesive is between about 20 and about 85 oz. per ½ inch.

19. A method for providing tamper detection to a sealed container wherein the seal is provided by a cap over the open mouth of said container, said method comprising adhesively attaching to said cap and said container a pressure sensitive tape, said tape comprising a backing with a pressure sensitive adhesive thereon, said backing comprising a heat shrinkable outer layer having a sufficiently high tensile strength to maintain its integrity when removed from said tape and a plastic inner layer, adjacent said adhesive, which is thin and stretchable or deformable, the adhesion between said outer and inner layers being sufficiently low when compared to the adhesion between said adhesive and said inner layer, whereby said outer layer may be removed from said inner layer without disrupting the adhesive bond between said inner layer and said adhesive; heating of said tape to cause shrinkage thereof around said cap and container.

20. The method of claim 19 wherein said inner layer has an elongation from about 200 to about 600 percent.

21. The method of claim 19 wherein said inner layer is colorless and transparent.

22. The method of claim 19 wherein said outer layer is selected from the group consisting of polyvinyl chloride, polystyrene, styrene/butadiene copolymers, polypropylene and copolyesters.

23. The method of claim 19 wherein said inner layer is selected from the group consisting of polyethylene, ethylene/vinyl acetate copolymers and ethylene/propylene copolymers.

24. The method of claim 23 wherein said ethylene/vinyl acetate copolymer contains from about 7 to about 15 percent by weight vinyl acetate therein.

25. The method of claim 19 wherein the peel adhesion between said inner and outer layers is from about 0.035 to about 3.5 oz. per ½ inch.

26. The method of claim 19 wherein the adhesion value of said adhesive is between about 20 and about 85 oz. per ½ inch.

27. A unitary package comprising individual boxes having been unitized by the attachment thereto of a pressure sensitive tape, said tape comprising a backing with a pressure sensitive adhesive thereon, said backing comprising an outer layer having a sufficiently high tensile strength to maintain its integrity when removed from said tape and a polymeric inner layer, adjacent said adhesive, which is thin and stretchable or deformable, the adhesion between said outer and inner layers being sufficiently low when compared to the adhesion between said adhesive and said inner layer, whereby said outer layer may be removed from said inner layer without disrupting the adhesive bond between said inner layer and said adhesive.

28. The package of claim 27 wherein said inner layer is colorless and transparent.

29. The package of claim 27 wherein said outer layer is selected from the group consisting of polyvinyl chloride, polystyrene, styrene/butadiene copolymers, polypropylene, polyester and copolyesters.

30. The package of claim 27 wherein said inner layer is selected from the group consisting of polyvinyl acetate, vinyl acetate/maleate copolymers and vinyl chloride/vinyl acetate copolymers.

31. The package of claim 30 wherein said vinyl acetate copolymers contain from about 4 to about 96 percent by weight vinyl acetate therein.

32. The package of claim 27 wherein the peel adhesion between said outer and inner layers is from about 0.035 to about 3.5 oz. per ½ inch.

33. The package of claim 27 wherein the adhesion value of said adhesive is between about 20 and about 85 oz. per ½ inch.

* * * * *